United States Patent [19]

Blood

[11] Patent Number: 5,752,004
[45] Date of Patent: May 12, 1998

[54] METHOD AND SYSTEM FOR MODIFYING AN INTERNAL DATA PROCESSING SYSTEM IDENTIFICATION

[75] Inventor: Roger Morton Blood, Austin, Tex.

[73] Assignee: International Business Machines Corporation, Armonk, N.Y.

[21] Appl. No.: 509,257

[22] Filed: Jul. 31, 1995

[51] Int. Cl.$^6$ .................................................. G06F 11/00
[52] U.S. Cl. ................. 395/500; 395/182.08; 395/261.2; 395/266.6; 395/286.4; 364/DIG. 1
[58] Field of Search ............................... 395/500, 182.01, 395/182.08, 491, 180

[56] References Cited

U.S. PATENT DOCUMENTS

| | | |
|---|---|---|
| 4,937,863 | 6/1990 | Robert et al. |
| 5,148,540 | 9/1992 | Beardsley et al. ............... 395/575 |
| 5,204,897 | 4/1993 | Wyman. |
| 5,291,598 | 3/1994 | Grundy. |
| 5,375,240 | 12/1994 | Grundy. |
| 5,440,727 | 8/1995 | Bhide et al. ........................ 395/444 |
| 5,473,771 | 12/1995 | Burd et al. ..................... 395/182.02 |
| 5,574,882 | 11/1996 | Menon et al. ..................... 395/441 |

*Primary Examiner*—Kevin J. Teska
*Assistant Examiner*—Ayni Mohamed
*Attorney, Agent, or Firm*—Richard A. Henkler

[57] ABSTRACT

A method and system for modifying an identification associated with and stored internally in a computer system. Software can distinguish one computer system from another based upon an identification which is typically associated with the Central Processing Unit (CPU) of the computer system. Problems arise, however, when the CPU or other component containing the identification fail, and are replaced with components having a new identification. These problems are alleviated via the use of modifiable memory by the replacement component for storing its associated identification, and a modifying unit which can reside in the replacement component, operating system, or take the form of an application program. The modifying unit is invoked and passed an encrypted key value comprising the failed identification and the replacement identification. The modifying unit verifies that the current identification of the computer system matches that of the replacement identification, and then modifies the current identification to equal the failed identification.

10 Claims, 3 Drawing Sheets

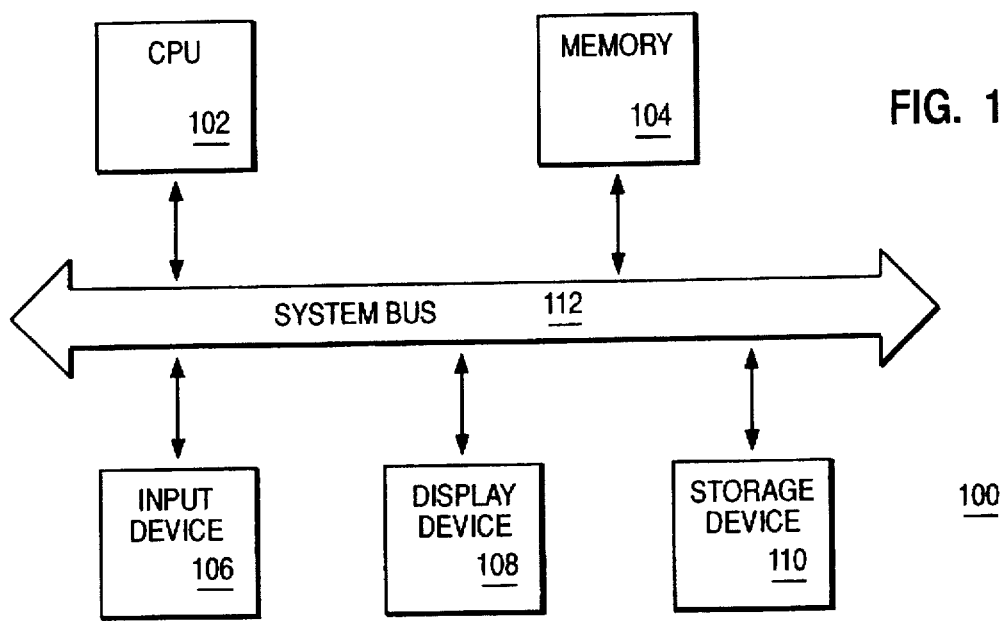
FIG. 1
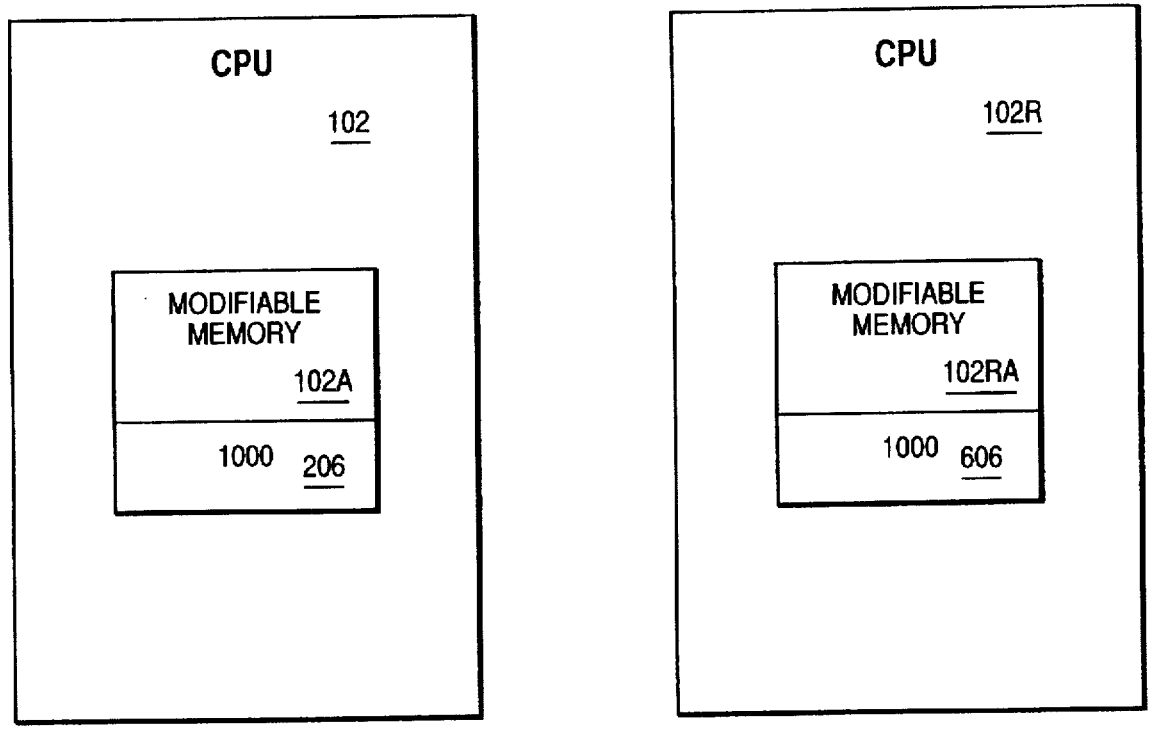
FIG. 2
FIG. 6

METHOD AND SYSTEM FOR MODIFYING AN INTERNAL DATA PROCESSING SYSTEM IDENTIFICATION

BACKGROUND

1. Field of the Present Invention

The present invention generally relates to data processing systems, and more specifically, to methods and systems for modifying an internal identification associated with a data processing system.

2. History of Related Art

Currently, several manufacturers of Central Processing Units (CPUs) are associating a unique identification number (ID) with the CPU, and storing the ID internally within the CPU. The integration of the ID into the CPU is typically accomplished by programming a specific area of the boot firmware of the CPU with a unique code. The ID is typically used by the manufacturer for identifying the associated CPU after fabrication. The identification may be used by the manufacturer for recalls, batch processing statistics, or the like. It should readily be apparent that once the CPU is integrated into a computer system, the computer system itself will also be uniquely identifiable by the CPU ID.

This type of identification is of great use and interest to the software industry as a means for controlling unauthorized copying of their software products. This is typically accomplished by allowing the software to only operate on computer systems which have CPU IDs that are identified by the software as having authorization for its execution. The authorization is often performed during the installation of the software onto a data processing system. The installation is designed so as to allow a pre-arranged number of computer systems to execute the software. This is accomplished by having the software, during installation, internally record (register) the identification (CPU ID) of the computer system on which it is being installed. The software is designed so that it will not execute on a computer system unless the CPU ID of the computer system is registered. Thus, having the intended effect of rendering an unauthorized copy of the software non-executable.

Unfortunately, hardware does not operate perpetually and eventually some components of a computer system will inevitably fail. One such component may be the CPU or any other component having the identification for the computer system. When this component is replaced, the replacement component will not have the same identification number (ID) as the failed component. Thus, resulting in the unintended effect of having the computer system appear as an unauthorized user of the software installed thereon. If the user of the repaired computer system desires to use the software, then they must contact the vendor of the software and obtain a new software licensing mechanism. Unfortunately, the vendor of the software is unable to provide a new licensing mechanism without some passage of time. The above process is repeated for each copy of software, owned by the user, which had registered the failed CPU ID. This process, typically, results in the user forgoing use of the inoperable software for several days, if not, weeks Thus, resulting in the loss of revenue from employment and other resources.

It would be a distinct advantage to have a method and system which would allow the ID of a replacement component to be re-assigned as the ID of the defective component. Thus, allowing the software to operate on the replacement component, as intended, without requiring the authorized user of the software to forgo use of the software for an extended period of time.

SUMMARY OF THE PRESENT INVENTION

The present invention is a method and system for modifying the identification of a computer system. More specifically, in another aspect, the present invention is a method of modifying an identification of a computer system. The failure of a component of the computer system having an identification is identified and replaced with a replacement component having modifiable memory. The modifiable memory having an identification for the replacement component stored therein. The replacement identification is then modified to equal the failed identification.

In another aspect, the present invention is an apparatus for modifying the identification of a computer system. The apparatus comprising means for receiving a key value comprising a current identification and a replacement identification. The apparatus further comprising means for comparing said current identification to said replacement identification to determine if they are equal.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 1 is a schematic diagram illustrating various components of a computer system in which a preferred embodiment of the present invention executes;

FIG. 2 is a block diagram illustrating in greater detail the CPU of the computer system of FIG. 1 according to the teachings of the present invention;

FIG. 6 is a block diagram illustrating the modified identification of the replacement CPU of FIG. 3 according to the teachings of the present invention.

DETAILED DESCRIPTION OF THE PREFERRED EMBODIMENT OF THE PRESENT INVENTION

Figure 3:
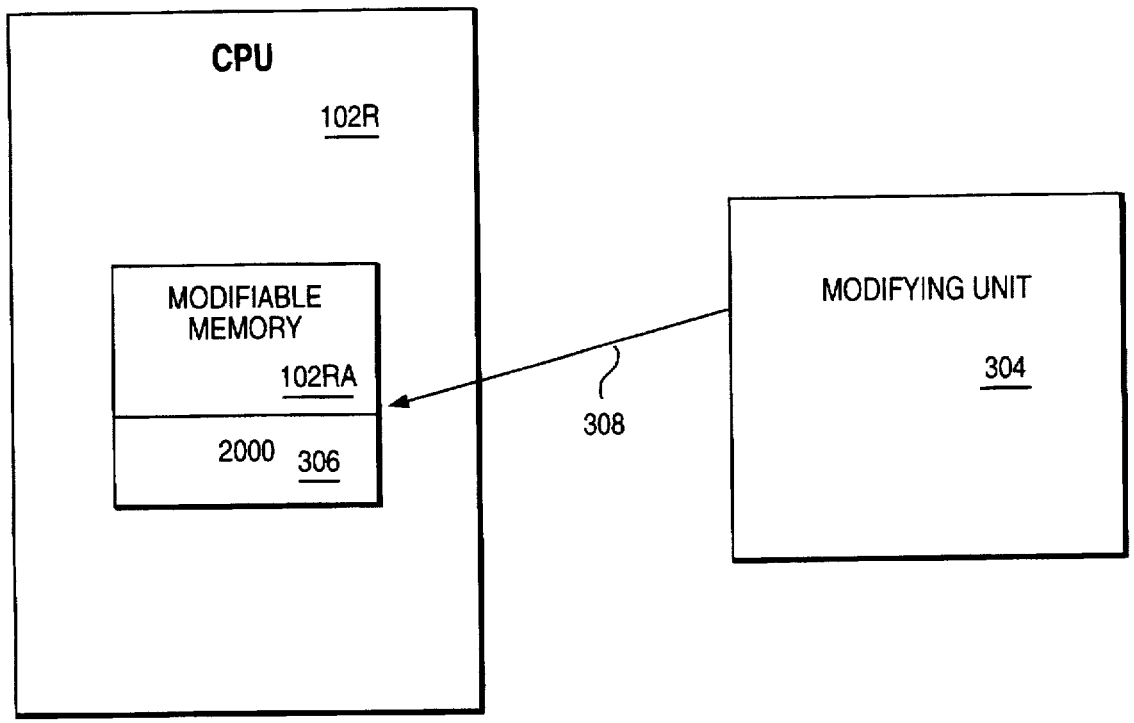
FIG. 3 is a block diagram illustrating the modification of an identification for a CPU which replaces the failed CPU of the computer system of FIG. 1 according to the teachings of the present invention.

Reference now being made to FIG. 1, a schematic diagram is shown illustrating various components of a computer system 100 in which a preferred embodiment of the present invention executes. Computer system 100 may be, for example, a RISC System/6000 [TM] produced by International Business Machines (IBM). In general, computer system 100 includes a Central Processing Unit (CPU) 102, memory 104, an input device 106, a display device 108, and a storage device 110. Each of the components of the computer system 100 are interconnected one to another via system bus 112 which is also part of computer system 100. A brief description for each of the above noted components is provided below.

CPU 102 is the brains of computer system 100, and may be, for example, a PowerPc [TM] 620 produced by IBM. Memory 104 is used for storing information for execution by CPU 102. Input device 106 provides the necessary inputs from a user and/or other device. Display device 108 is used for displaying information concerning the operations within computer system 100. Storage device 110 is used for storing information for future retrieval by CPU 102.

Reference now being made to FIG. 2, a block diagram is shown illustrating in greater detail CPU 102 of FIG. 1 according to the teachings of the present invention. As shown in FIG. 2, CPU 102 includes modifiable memory 102A for storing an identification number ID 206 associated with CPU 102. Modifiable memory 102A must be modifiable and able to maintain data once power to the computer system 100 is turned off. Modifiable memory 102A may be, for example, Flash or CMOS memory, and is typically contained in some fashion of a sealed package.

In the preferred embodiment, modifiable memory 102A is shown as residing within CPU 102. It should be clearly understood, however, that modifiable memory 102A can also reside in any other component of the computer system 100 so long as it contains an identification code which renders computer system 100 unique. However, in order to better clarify the novel aspects of the present invention, only the embodiment of FIG. 2 is discussed in connection therewith.

In this example, it is assumed that ID 206 has an arbitrarily chosen value of 1000. During the operation of computer system 100 (FIG. 1), CPU 102 or any other component of computer system 100 containing modifiable memory 102A can fail. Upon identification of the failed component, a replacement component is substituted. This replacement component, however, has an identification value which is different from the value stored in modifiable memory 102A. Software which has registered the failed ID 206 as the authorizing identification will fail to operate on the repaired computer system 100. In this example, it assumed that CPU 102 is the failed component. It should also be clearly understood, that although the CPU 102 has modifiable memory 102A, the novel aspects of the present invention would be equally applicable to a failed CPU or other component having a non-modifiable memory, such as Read Only Memory (ROM).

Reference now being made to FIG. 3, a block diagram is shown illustrating the modification of an ID 306 for a CPU 102R that replaces the failed CPU 102 of FIG. 1 according to the teachings of the present invention. As shown in FIG. 3, the replacement CPU 102R includes modifiable memory 102RA with a stored ID 306 having a value of 2000. A modifying unit 304 is used for modifying the value of the ID 306 from 2000 to the value (1000) of the failed ID 206 via logic path 308. It should be understood that modifying unit 304 can reside as part of the BIOS (not shown) for computer system 100, as an application program executing on computer system 100, or as part of the operating system (not shown) for computer system 100.

Figure 4:
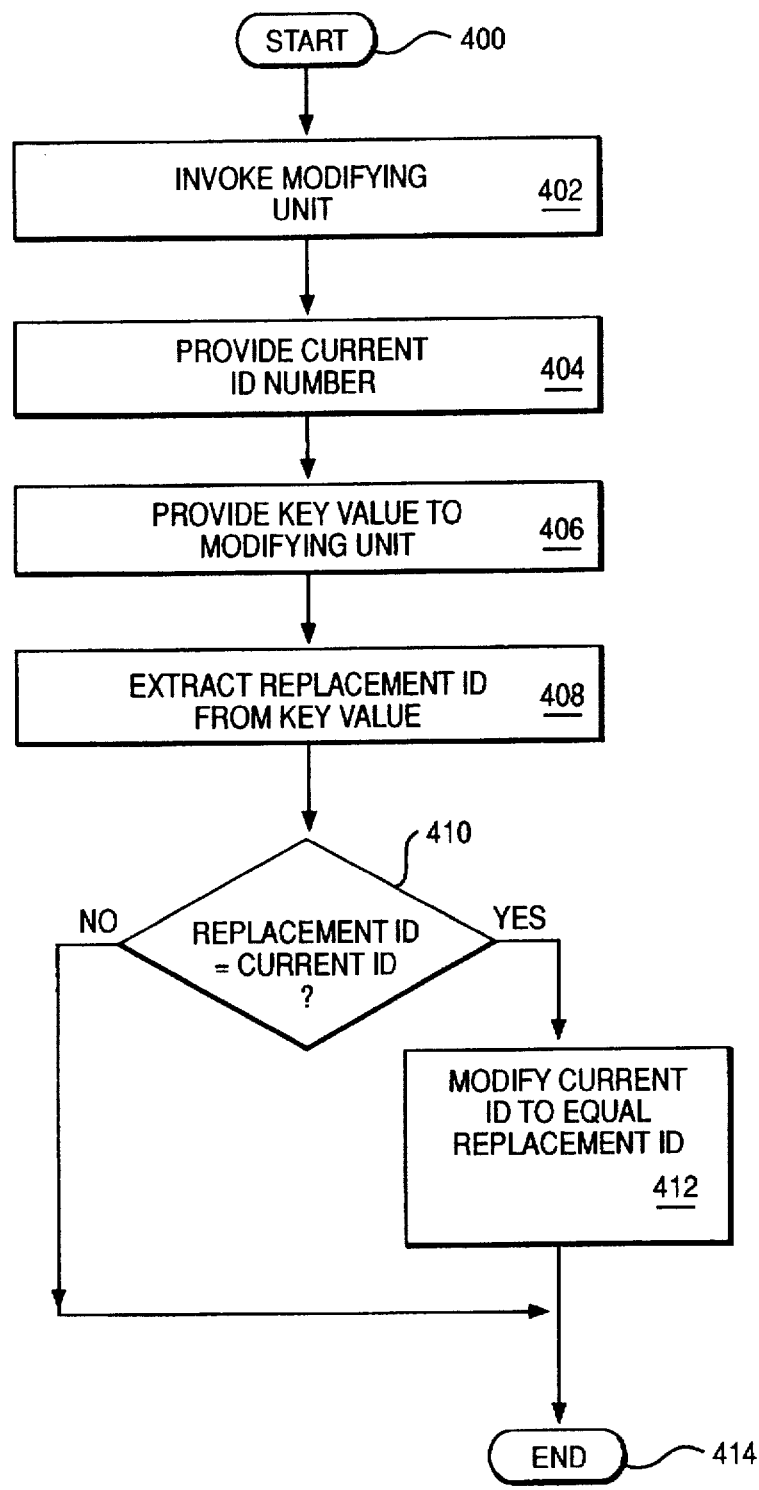
FIG. 4 is a flow chart illustrating the steps comprising the process for changing the value of the identification of the replacement CPU of FIG. 3 to the value of the identification of the failed CPU of FIG. 1 according to the teachings of the present invention.

Reference now being made to FIG. 4, a flow chart is shown illustrating the steps comprising the process for changing the value (2000) of the replacement ID 306 of CPU 102R to the value (1000) of the failed ID 206 of CPU 102 according to the teachings of the present invention. The process begins at step 400 where failed CPU 102 has been replaced with CPU 102R. Thereafter, the process proceeds to step 402 where modifying unit 304 is invoked by the user (not shown) of computer system 100 (FIG. 1). In response,
the modifying unit 304 provides the user with the value (2000) of the current ID 306 stored within modifiable memory 102RA at step 404. The user then contacts an authorizing agent with the value (2000) of the current ID 306 and the value (1000) of the failed ID 206. The authorizing agent uses these values to generate an encrypted key value which is then communicated to the user. The encrypted key value prevents inappropriate usage of modifying unit 304.

Figure 5:
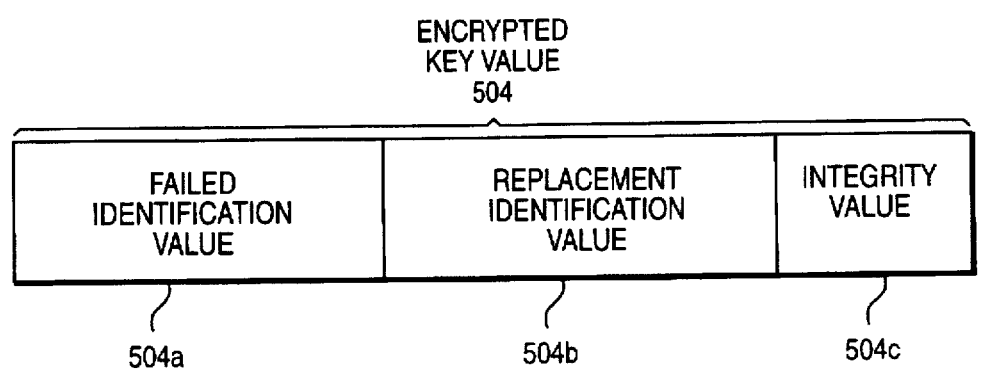
FIG. 5 is a block diagram of an example of an encrypted key value communicated by the user to a modifying unit during the process of FIG. 4 according to the teachings of the present invention.

Reference now being made to FIG. 5, a block diagram is shown illustrating an example of an encrypted key value 504 provided to the modifying unit 304 of FIG. 3 according to the teachings of the present invention. The encrypted key value 504 comprises the value of the failed identification number (ID) 504a for CPU 102, the value of the replacement identification number (ID) 504b for CPU 102R, and an integrity value 504c.

Reference being made again to FIG. 4, at step 406, the encrypted key value 504 is communicated by the user to the modifying unit 304 via input device 106 (FIG. 1). At step 408, the modifying unit 304 extracts the integrity value 504C from the encrypted key value 504 to verify the integrity of the key value 504 using well known and understood verification techniques. Thereafter, the process proceeds to step 410 where the value (2000) of the replacement ID 504b is compared to the value (2000) of the current ID 306 to determine if they are equal. If, at 410, it is determined that the value of the replacement ID 504b equals the value (2000) of the current ID 2000 306, then the process proceeds to step 412. If, however, it is determined, at step 410, that the value of the replacement ID 504b does not equal the value (2000) of the current ID 306, then the process proceeds to end at step 414. At step 412, modifying unit 304 modifies the value (2000) of the current ID 306 to equal the value (1000) of the failed ID 504a. Thereafter, the process ends at step 414.

Reference now being made to FIG. 6, a block diagram is shown illustrating the modified modifiable memory 102RA of FIG. 3 according to the teachings of the present invention. After execution of the modifying unit 304 (FIG.3) as explained in connection with FIG. 4, modifiable memory 102RA of CPU 102R now contains a stored identification number 606 having a value of 1000 which is equivalent to the value (1000) of the failed identification number 206.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. A method of modifying an identification of a computer system, said method comprising the steps of:

detecting a failure of a central processing unit of said computer system, said failed central processing unit having an identification of the entire computer system;

replacing said failed central processing unit with a replacement central processing unit having modifiable memory, said modifiable memory containing a replacement identification for the entire computer system;

creating a key value having a verification identification and said failed identification;

extracting the verification identification and said failed identification from the key value;

comparing said verification identification to said replacement identification to determine if they are equal; and modifying, in response to determining that the verification identification equals the replacement identification, said replacement identification to equal said failed identification.

2. A method of modifying an identification of a computer system said method comprising the steps of:

detecting a failure of a component of said computer system, said failed component having an identification used for identifying the entire computer system;

replacing said component with a replacement component having modifiable memory, said modifiable memory containing a replacement identification for identifying the entire computer system;

extracting a verification identification and said failed identification from a key value;

comparing said verification identification to said replacement identification to determine if they are equal; and modifying, in response to determining that the verification identification equals the replacement identification, said replacement identification to equal said failed identification.

3. The method of claim 2 wherein the key value is encrypted.

4. The method of claim 2 wherein the failed component and the replaced component are both central processing units.

5. An apparatus for modifying an identification of a computer system, the apparatus comprising:

means for detecting a failure of a central processing unit of said computer system, said failed central processing unit having an identification of the entire computer system;

means for replacing said failed central processing unit with a replacement central processing unit having modifiable memory, said modifiable memory containing a replacement identification for the entire computer system;

means for creating a key value having a verification identification and said failed identification;

means for extracting the verification identification and said failed identification from the key value;

means for comparing said verification identification to said replacement identification to determine if they are equal; and means for modifying, in response to determining that the verification identification equals the replacement identification, said replacement identification to equal said failed identification.

6. An apparatus of modifying an identification of a computer system, the apparatus comprising:

means for detecting a failure of a component of said computer system, said failed component having an identification used for identifying the entire computer system;

means for replacing said component with a replacement component having modifiable memory, said modifiable memory containing a replacement identification for identifying the entire computer system;

means for extracting a verification identification and said failed identification from a key value;

means for comparing said verification identification to said replacement identification to determine if they are equal; and means for modifying, in response to determining that the verification identification equals the replacement identification, said replacement identification to equal said failed identification.

7. The apparatus of claim 6 wherein the key value is encrypted.

8. The method of claim 6 wherein the failed component and the replaced component are both central processing units.

9. An apparatus for modifying an identification of a computer system, the apparatus comprising:

means for detecting a failure of a component of said computer system, said failed component having an identification of the entire computer system;

means for replacing said failed component with a replacement component having modifiable memory, said modifiable memory containing a replacement identification for the entire computer system;

means for retrieving said replacement identification from said modifiable memory using a modifying unit in said computer system;

means for creating a key value having a verification identification and said failed identification;

means for providing said key value to said modifying unit;

means for extracting said verification and failed identifications from said key value using said modifying unit;

means for comparing, with said modifying unit, said verification identification to said replacement identification to determine if they are equal; and means for modifying, with said modifying unit, said replacement identification to equal said failed identification in response to determining said replacement identification equals said verification identification.

10. A method of modifying an identification of a computer system, said method comprising the steps of:

detecting a failure of a component of said computer system, said failed component having an identification for the entire computer system;

replacing said failed component with a replacement component having modifiable memory, said modifiable memory containing a replacement identification for the entire computer system;

retrieving said replacement identification from said modifiable memory using a modifying unit in said computer system;

creating a key value having a verification identification and said failed identification;

providing said key value to said modifying unit;

extracting said verification and failed identifications from said key value using said modifying unit;

comparing, with said modifying unit, said current identification to said replacement identification to determine if they are equal; and modifying, with said modifying unit, said replacement identification to equal said failed identification in response to determining said replacement identification equals said verification identification.

* * * * *